United States Patent
Jung

(10) Patent No.: US 12,390,772 B2
(45) Date of Patent: Aug. 19, 2025

(54) POLYETHYLENE MICROPOROUS MEMBRANE, METHOD FOR MANUFACTURING THE SAME, AND SEPARATOR INCLUDING MICROPOROUS MEMBRANE

(71) Applicants: SK INNOVATION CO., LTD., Seoul (KR); SK IE TECHNOLOGY CO., LTD., Seoul (KR)

(72) Inventor: In Hwa Jung, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 0 days.

(21) Appl. No.: 18/663,987

(22) Filed: May 14, 2024

(65) Prior Publication Data
US 2024/0382909 A1    Nov. 21, 2024

(30) Foreign Application Priority Data

May 15, 2023    (KR) .................. 10-2023-0062318

(51) Int. Cl.
| | | |
|---|---|---|
| *H01M 50/00* | (2021.01) | |
| *B01D 67/00* | (2006.01) | |
| *B01D 69/02* | (2006.01) | |
| *B01D 71/26* | (2006.01) | |
| *H01M 50/406* | (2021.01) | |
| *H01M 50/417* | (2021.01) | |

(52) U.S. Cl.
CPC ......... *B01D 71/261* (2022.08); *B01D 67/002* (2013.01); *B01D 67/0027* (2013.01); *B01D 69/02* (2013.01); *H01M 50/406* (2021.01); *H01M 50/417* (2021.01); *B01D 2325/02* (2013.01); *B01D 2325/04* (2013.01); *B01D 2325/20* (2013.01); *B01D 2325/22* (2013.01); *B01D 2325/24* (2013.01); *B01D 2325/28* (2013.01); *B01D 2325/34* (2013.01)

(58) Field of Classification Search
CPC .... H01M 50/417; H01M 50/489; Y02E 60/10
See application file for complete search history.

(56) References Cited

U.S. PATENT DOCUMENTS

| | | | |
|---|---|---|---|
| 2006/0228540 A1* | 10/2006 | Lee ................. | H01M 50/489 428/319.7 |
| 2013/0177755 A1 | 7/2013 | Kang et al. | |

FOREIGN PATENT DOCUMENTS

| | | |
|---|---|---|
| CN | 109517210 A * | 3/2019 |
| EP | 2212946 B1 | 2/2013 |
| JP | 2008540794 A6 * | 3/2009 |
| JP | 2009-132904 A | 6/2009 |
| JP | 2013-517969 A | 5/2013 |
| JP | 2019-016522 A | 1/2019 |
| JP | 2023-020701 A | 2/2023 |
| KR | 10-2010-0082778 A | 7/2010 |
| KR | 10-2013-0080928 A | 7/2013 |
| KR | 10-2016-0049492 A | 5/2016 |
| WO | 2017/170289 A1 | 10/2017 |

OTHER PUBLICATIONS

リー ヨンケウン et al., High Density Polyethylene Microporous Membrane Excellent In Extrusion Kneadability And Physical Properties And Method For Producing The Same, Mar. 5, 2009, See the Abstract. (Year: 2009).*
Taguchi et al., Polyolefin Microporous Membrane Comprises Polyethylene, The Membrane Has Heat Shrinkage In Both Transverse Direction And Machine Direction Directions, The Polyolefin Has Puncture Strength, Mar. 2019, See the Abstract. (Year: 2019).*
Extended European Search Report for European Patent Application No. 24175804.4 issued by the European Patent Office on Oct. 9, 2024.
Office Action for Korean Patent Application No. 10-2023-0062318 issued by the Korean Intellectual Property Office (KIPO) on Apr. 10, 2025.
Office Action for the Japanese Patent Application No. 2024-078105 issued by the Japanese Patent Office on May 27, 2025.

* cited by examiner

*Primary Examiner* — Anca Eoff
*Assistant Examiner* — Monique M Wills
(74) *Attorney, Agent, or Firm* — IP & T GROUP LLP

(57) ABSTRACT

Provided are a polyethylene microporous membrane, a method for manufacturing the same, and a separator including the microporous membrane. According to an embodiment, a polyethylene microporous membrane which has a thickness of 3 μm to 30 μm, a puncture strength of 0.15 N/μm or more, a shrinkage rate in the transverse direction of 5% or less as measured after being allowed to stand at 121° C. for 1 hour, and a PS index represented by the following Equation 1 of 110 or more is provided:

PS index=[gas permeability ($\times 10^{31\ 5}$ Darcy)×porosity (%)]+[shrinkage rate (%) in the transverse direction at 121° C.].        [Equation 1]

12 Claims, No Drawings

POLYETHYLENE MICROPOROUS MEMBRANE, METHOD FOR MANUFACTURING THE SAME, AND SEPARATOR INCLUDING MICROPOROUS MEMBRANE

CROSS-REFERENCE TO RELATED APPLICATIONS

This application claims priority under 35 U.S.C. § 119 to Korean Patent Application No. 10-2023-0062318, filed on May 15, 2023, in the Korean Intellectual Property Office, the disclosure of which is incorporated herein by reference in its entirety.

TECHNICAL FIELD

The following disclosure relates to a polyethylene microporous membrane, a method for manufacturing the same, and a separator including the microporous membrane. According to an embodiment, the following disclosure relates to a polyethylene microporous membrane having improved heat resistance while having significantly high gas permeability and porosity, a method for manufacturing the same, and a separator including the microporous membrane.

BACKGROUND

A polyethylene microporous membrane is used in various fields such as a separation filter, a separator for a secondary battery, a separator for a fuel cell, and a separator for a supercapacitor. Among them, it is widely used as a separator for a secondary battery, since it has excellent electrical insulation, ion permeability, and the like.

Recently, since a secondary battery has a higher capacity and gets larger in order to be applied to an electric vehicle, an energy storage system (ESS) is becoming a more important element to secure battery safety. For example, when a battery is exposed to or operated at a high temperature, a separator may be shrunk to cause internal short circuit and there is a risk of fire due to the internal short circuit. Therefore, development of a polyethylene microporous membrane having excellent heat resistance is needed. A polyethylene microporous membrane having high mechanical strength is required to improve safety in a battery manufacture process and during use of the battery together with heat resistance, and high permeability and high porosity is required to improve a capacity and output.

Especially considering the recent trend towards larger battery capacities accompanied with increased size, there is a significant demand for a separator with increased heat resistance and permeability levels. A conventional separator that implements a high permeability may have excellent capacity and output properties, however, thermal safety may not be secured due to the inverse relationship between permeability and heat resistance.

As a method for solving the above problems, Korean Patent Laid-Open Publication No. 10-2012-0032539 discloses a polyolefin microporous membrane which has a large pore diameter to have excellent electrical properties, excellent strength, and low heat shrinkage. However, the microporous membrane as such only has a porosity of 40-50% and a gas permeability of 100-200 sec/100 ml while satisfying a heat shrinkage rate in a width direction at 130° C. of 20% or less, and thus, its physical properties do not meet the physical properties for being applied to a high-capacity and high-output battery.

Therefore, development of a polyethylene microporous membrane having significantly improved heat resistance at a high temperature while having significantly high permeability and porosity is demanded.

SUMMARY

An embodiment of the present disclosure is directed to providing a polyethylene microporous membrane having significantly improved heat resistance at a high temperature while having significantly high gas permeability and porosity, a method for manufacturing the same, and a separator including the microporous membrane.

The separator according to an embodiment of the present disclosure may be widely applied to a green technology field such as electric vehicles, battery charging stations, and other solar power generations and wind power generations using batteries. In addition, the separator of the present disclosure may be used in eco-friendly electric vehicles, hybrid vehicles, and the like which suppress air pollution and greenhouse gas emissions to prevent climate change.

In an embodiment, a polyethylene microporous membrane may have a thickness of 3 μm to 30 μm, a puncture strength of 0.15 N/μm or more, a shrinkage rate in the transverse direction of 5% or less as measured after being allowed to stand at 121° C. for 1 hour, and a PS index of 110 or more as represented by the following Equation 1

$$\text{PS index} = [\text{gas permeability} \times \text{porosity}] \div [\text{shrinkage rate in the transverse direction at } 121° \text{C.}] \quad \text{Equation 1}$$

wherein the unit of gas permeability is "×10⁻⁵ Darcy", the unit of porosity is "%", and the unit of shrinkage rate in the transverse direction at 121° C. is "%".

In an embodiment, the polyethylene microporous membrane may have the gas permeability of $10.0 \times 10^{-5}$ Darcy or more.

In an embodiment, the polyethylene microporous membrane may have the porosity of 55% to 70%, specifically 60% to 70%.

In an embodiment, the polyethylene microporous membrane may have the PS index of 220 or more, specifically 400 or more.

In an embodiment, the polyethylene microporous membrane may include a polyethylene having a weight average molecular weight of $1 \times 10^5$ g/mol to $10 \times 10^5$ g/mol.

In an embodiment, the polyethylene microporous membrane may be manufactured by a wet method including a sequential biaxial stretching process.

In an embodiment, a method for manufacturing a polyethylene microporous membrane includes: (a) melting and kneading a mixture including a polyethylene resin and a diluent through an extruder to prepare a melt; (b) extruding the melt to mold the melt into a sheet; (c) stretching the sheet in the machine direction 4 times or more; (d) extracting the diluent from the sheet stretched in the machine direction and drying the sheet; (e) stretching the sheet in the transverse direction 4 times or more to mold the sheet into a film; and (f) heat treating the film stretched in the transverse direction.

In an embodiment, (f) may include a heat relaxation operation of shrinking a transverse width of the film while fixing a longitudinal length of the film, and the heat relaxation operation shrinks the transverse width to 80% to 95% of an original transverse width of the film before the heat relaxation operation.

In an embodiment, a separator includes the polyethylene microporous membrane as described above.

In an example embodiment, a microporous membrane comprising:

a thin film of a thickness of 3 μm to 30 μm made of polyethylene having a weight average molecular weight of 1×10⁵ g/mol to 10×10⁵ g/mol, and a PS index represented by the following of 110 or more:

$$PS\ index = \text{gas permeability}\ (\times 10^{-5}\ \text{Darcy}) \times \text{porosity (\%)} \div \text{shrinkage rate (\%) in the transverse direction at 121° C.},$$

wherein the shrinkage rate is measured after being allowed to stand at 121° C. for 1 hour, wherein the gas permeability is 10.0×10⁻⁵ Darcy or more, and wherein the porosity is 55% to 70%.

In an example embodiment, an electrochemical device includes the separator.

In an example embodiment, the electrochemical device is a secondary battery comprising said separator between a positive electrode and a negative electrode.

Other features and aspects of the present invention will be apparent from the following detailed description and the drawings.

DETAILED DESCRIPTION OF EMBODIMENTS

The embodiments described in the present specification may be modified in many different forms, and the technology according to an aspect is not limited to the embodiments set forth herein. In addition, the embodiments of an aspect are provided so that the present disclosure will be described in more detail to a person with ordinary skill in the art.

In addition, the singular form used in the specification and claims appended thereto may be intended to include a plural form also, unless otherwise indicated in the context.

In addition, the numerical range used in the present specification includes all values within the range including the lower limit and the upper limit, increments logically derived in a form and span of a defined range, all double limited values, and all possible combinations of the upper limit and the lower limit in the numerical range defined in different forms.

Unless otherwise defined in the present specification, values which may be outside a numerical range due to experimental error or rounding off of a value are also included in the defined numerical range.

Furthermore, throughout the specification, unless explicitly described to the contrary, "comprising" any constituent elements will be understood to imply further inclusion of other constituent elements rather than exclusion of other constituent elements.

The present disclosure provides a polyethylene microporous membrane which has a thickness of 3 μm to 30 μm, a puncture strength of 0.15 N/μm or more, a shrinkage rate in the transverse direction of 5% or less as measured after being allowed to stand at 121° C. for 1 hour, and a PS index represented by the following Equation 1 of 110 or more:

$$PS\ index = [\text{gas permeability}\ (\times 10^{-5}\ \text{Darcy}) \times \text{porosity (\%)}] \div [\text{shrinkage rate (\%) in the transverse direction at 121° C.}]. \quad \text{Equation 1}$$

Recently, as a secondary battery has higher capacity and gets larger, better output properties and thermal safety are required to be met, and for this, a separator for a secondary battery is required to have higher levels of both heat resistance and permeability.

However, a previously developed separator has a limitation in implementing both heat resistance and permeability to a specific level or higher due to the inverse relationship between high permeability and heat resistance.

A separator formed of polyethylene microporous membrane according to an embodiment of the present disclosure may have significantly improved heat resistance at high temperature while having significantly high gas permeability and porosity. The polyethylene microporous membrane according to an embodiment of the present disclosure may have a shrinkage rate in the transverse direction of 5% or less as measured after being allowed to stand at 121° C. for 1 hour and satisfy a PS index of 110 or more.

A secondary battery according to an embodiment includes the polyethylene microporous membrane satisfying all of the physical properties as described above, thereby securing both excellent output properties and thermal safety. In particular, the present disclosure may provide a battery which may have excellent thermal safety at a high temperature so that battery fuming or ignition does not occur in a hot-box evaluation at a high temperature of 125° C. The manufacturing method of a battery for the evaluation and the evaluation method are as follows. A positive electrode using NCM 622 (Ni:Co:Mn=6:2:2) as an active material and a negative electrode using graphite carbon as an active material are wound with the microporous membrane of the present disclosure and added to an aluminum pouch to manufacture a battery. Subsequently, an electrolyte solution of 1 M lithium hexafluorophosphate (LiPF₆) dissolved in a solution including ethylene carbonate, ethyl methyl carbonate, and diethyl carbonate at a volume ratio of 3:5:2 is injected into the battery and the battery is sealed to manufacture a battery having a capacity of 2 Ah. Subsequently, the battery is subjected to aging and degassing operations, fully charged to 4.2 V, and put into an oven, which was heated at a rate of 5° C./min to reach 125° C. and then allowed to stand for 30 minutes, thereby confirming whether fuming or ignition occurred in the battery. The polyethylene microporous membrane manufactured according to an embodiment of the present disclosure may be suitable for a high output and high capacity battery.

The physical properties described above of the polyethylene microporous membrane of the present disclosure may be implemented by performing the operation of extracting a diluent before the operation of stretching in the transverse direction during manufacture of the polyethylene microporous membrane or performing the operation of heat treating in the transverse direction under specific conditions, but are not necessarily limited thereto.

The PS index calculated by Equation 1 becomes larger as the gas permeability and the porosity increase and the heat shrinkage rate in the transverse direction decreases. In an embodiment, the PS index may be 110 or more, 220 or more, 400 or more, or 500 or more. A larger PS index is better, and its upper limit is not particularly limited, but, for example, the upper limit may be 2000 or 1500. In a specific embodiment, the PS index may be 110 to 2000, 220 to 2000, 400 to 1500, or 500 to 1500, but is not limited thereto. When the PS index falls within the ranges described above, the microporous membrane has excellent heat resistance while having high gas permeability and porosity to be appropriate for being applied to a high output/high capacity battery.

In an embodiment, the polyethylene microporous membrane may have the PS index in the ranges described above and also a shrinkage rate in the transverse direction of 5% or less, 3% or less, or 2.5% or less as measured after being allowed to stand at 121° C. for 1 hour, and the lower limit is not particularly limited, but for example, may be 0.1%, 0.5%, or 1%. In a specific embodiment, the shrinkage rate may be 0.1% to 5% 0.5% to 5%, 1% to 3%, or 1% to 2.5%, but is not limited thereto.

In an embodiment, the polyethylene microporous membrane may have a thickness of 3 μm to 30 μm, specifically 5 μm to 20 μm, and more specifically 5 μm to 15 μm. The microporous membrane of the present disclosure may implement excellent levels of puncture strength, gas permeability, and heat shrinkage rate even with the thickness range described above. Accordingly, it may have resistance to external stress occurring during manufacture of a battery, a temperature rise occurring during charge and discharge of a battery, a dendrite, and the like. Accordingly, a battery including the polyethylene microporous membrane may have low internal resistance and improved charge and discharge performance.

In an embodiment, the polyethylene microporous membrane may have a puncture strength of 0.15 N/μm or more even in the thickness ranges described above, and specifically, the puncture strength may be 0.17 N/μm or more, or 0.26 N/μm or more and its upper limit is not particularly limited, but for example, may be 1.0 N/μm or less. In a specific embodiment, the puncture strength may be 0.15 N/μm to 1.0 N/μm or 0.17 N/μm to 1.0 N/μm or 0.26 N/μm to 1.0 N/μm, but is not limited thereto. When the puncture strength falls within the ranges described above, resistance to external stress occurring during manufacture of a battery, a dendrite occurring during charge and discharge of a battery, and the like improves, and thus, battery safety may be secured. In addition, the secondary battery's separator may become thinner than conventional separators, and the secondary battery including such separator may have high capacity and output performances.

In an embodiment, the polyethylene microporous membrane may have a gas permeability of $10.0 \times 10^{-5}$ Darcy or more. In an embodiment, gas permeability may be $15.0 \times 10^{-5}$ Darcy or more, $20.0 \times 10^{-5}$ Darcy or more, or $25.0 \times 10^{-5}$ Darcy or more. The upper limit of the gas permeability is not particularly limited, but for example, may be $50.0 \times 10^{-5}$ Darcy or less, $40.0 \times 10^{-5}$ Darcy or less, or $35.0 \times 10^{-5}$ Darcy or less. In a specific embodiment, the gas permeability may be $10.0 \times 10^{-5}$ Darcy to $50.0 \times 10^{-5}$ Darcy, $15.0 \times 10^{-5}$ Darcy to $50.0 \times 10^{-5}$ Darcy, $20.0 \times 10^{-5}$ Darcy to $40.0 \times 10^{-5}$ Darcy, or $25.0 \times 10^{-5}$ Darcy to $35.0 \times 10^{-5}$ Darcy, but is not limited thereto. When the gas permeability falls within the ranges described above, ion conductivity may improve, and battery output characteristics may be significantly improved due to low battery internal resistance.

In an embodiment, the polyethylene microporous membrane may have porosity of 55% to 70%, or 60% to 70%. When the porosity falls within the ranges described above, battery output characteristics may be significantly improved due to low internal resistance of the battery.

In an embodiment, the polyethylene microporous membrane may include a polyethylene having a weight average molecular weight of $1 \times 10^5$ g/mol to $10 \times 10^5$ g/mol.

In an embodiment, the polyethylene may have a weight average molecular weight of $3 \times 10^5$ g/mol to $8 \times 10^5$ g/mol, but is not necessarily limited thereto.

In an embodiment, the polyethylene microporous membrane may be manufactured by a wet method including a sequential biaxial stretching process, and a polyethylene microporous membrane satisfying the physical properties as described above simultaneously may be provided by adopting the described process sequence and/or changing the specific heat treatment process conditions.

In an embodiment, the polyethylene microporous membrane may be manufactured by a method of stretching in any one direction, then extracting a diluent, and stretching in another direction, a method of heat treating a sequentially biaxially stretched film under specific conditions, or a combination thereof.

Specifically, the polyethylene microporous membrane may be manufactured by performing a process of extracting a diluent before a process of stretching in the transverse direction after stretching in the machine direction during manufacture of a polyethylene microporous membrane, but is not necessarily limited thereto as long as the microporous membrane having the physical properties as described above may be manufactured.

Hereinafter, the method for manufacturing a polyethylene microporous membrane according to an embodiment of the present disclosure will be described.

The method for manufacturing a polyethylene microporous membrane according to an embodiment may include: (a) melting and kneading a mixture including a polyethylene resin and a diluent through an extruder to prepare a melt; (b) extruding the melt and molding the into a sheet; (c) stretching the sheet in the machine direction 4 times or more; (d) extracting the diluent from the sheet stretched in the machine direction and drying the sheet; (e) stretching the dried sheet in the transverse direction 4 times or more and molding the dried sheet into a film; and (f) heat treating the film.

In the embodiment, unlike a conventional process of extracting a diluent after stretching in the machine direction and the transverse direction, stretching in the transverse direction is performed after extracting a diluent in a sheet stretched in the machine direction. Therefore, a polyethylene microporous membrane manufactured according to the embodiment of the present disclosure may have significantly high porosity, gas permeability, and heat resistance as the polyethylene microporous membrane have pores greatly expanded by stretching.

Hereinafter, each manufacturing operation will be described.

First, (a) is an operation of melting and kneading a mixture including a polyethylene resin and a diluent through an extruder to prepare a melt, and the mixture may include the polyethylene resin and the diluent at a weight ratio ranging from 10:90 to 60:40 for forming pores. In an embodiment the weight ratio may range from 20:80 to 40:60, but is not particularly limited as long as the purpose of the present disclosure is achieved. When the weight ratio falls within the ranges described above, the melt has sufficient flowability, so that it is easy to perform uniform sheet molding in a subsequent operation. Also, sufficient orientation may be achieved in a stretching process without fracturing so that a desired mechanical strength and other desired physical properties may be obtained.

The polyethylene resin may be a high-density polyethylene or include a high-density polyethylene in terms of strength, extrusion kneadability, stretchability, heat resistance of a final microporous membrane, and the like.

In an embodiment, the polyethylene resin may have a weight average molecular weight of $1 \times 10^5$ g/mol to $10 \times 10^5$ g/mol, or $3 \times 10^5$ g/mol to $8 \times 10^5$ g/mol, but is not necessarily limited thereto.

In an embodiment, the polyethylene resin may have a melting temperature of 130° C. or higher, or 130°° C. to 140° C., but is not necessarily limited thereto. The melt temperature of the polyethylene resin may be determined by DSC.

In an embodiment, as the diluent, any organic compound forming a single phase with the polyethylene resin at extrusion temperature may be used without limitation. In an embodiment, for example, the diluent may be one or a combination of two or more selected from the group consisting of aliphatic or cyclic hydrocarbons such as nonane, decane, decalin, paraffin oil, and paraffin wax, phthalic acid esters such as dibutyl phthalate and dioctyl phthalate, C10-C20 fatty acids such as palmitic acid, stearic acid, oleic acid, linoleic acid, and linolenic acid, and C10-C20 fatty alcohols such as cetyl alcohol, stearyl alcohol, and oleyl alcohol. In an embodiment, the diluent may include a paraffin oil having a kinetic viscosity of 20 cSt to 200 cSt at 40° C., but is not limited thereto.

In addition, the mixture may further include any one or more of additives for improving specific functions such as an oxidation stabilizer, a UV stabilizer, and an antistatic agent in a range where the characteristics of the microporous membrane are not greatly deteriorated.

Operation (b) is an operation of extruding the melt to mold the melt into a sheet and may be performed without limitation by a method known to a person skilled in the art. In an embodiment, for example, the melt may be molded into a sheet by a casting or calendaring method while the melt is extruded through a T-die and cooled to a temperature of 10°° C. to 80° C.

In operation (c), a stretch ratio in the machine direction may be 4 times or more, for example, 4 times to 15 times. In an embodiment, the stretch ratio may be 6 times to 10 times. When the stretch ratio in the machine direction falls within the ranges described above, a polyethylene microporous membrane having the physical properties desired in the present disclosure may be manufactured.

Stretching in the operation (c) may be performed in a roll or tenter method, and performed at a temperature in a range from a temperature lower than the melting temperature of polyethylene by 60° C. to the melting temperature of polyethylene. When the stretching is performed in the temperature ranges described above, flowability of the polyethylene resin for effective stretching may be secured. Specifically, since stretching occurs uniformly throughout the sheet and fracture by stretching does not occur, stretching operation may performed, and thus, a high-quality microporous membrane which implements physical properties such as uniform gas permeability, puncture strength, and porosity throughout the membrane may be manufactured. In an embodiment, the stretching operation may be performed at 80° C. to 140° C. or 90° C. to 125° C., but is not limited thereto.

(d) is an operation of extracting the diluent from the sheet stretched in the machine direction and drying the sheet. The diluent inside the film is extracted using an organic solvent and the organic solvent is dried in the film in which the diluent is replaced with the organic solvent. The organic solvent may be used without particular limitation as long as the diluent may be extracted. Specifically, as the organic solvent, methyl ethyl ketone, methylene chloride, hexane, and the like may be used in terms of high extraction efficiency and rapid drying.

Operation (d) may be performed at a high temperature for increasing solubility of the diluent and the organic solvent, however, for safety considerations the temperature is kept 40° C. or lower above the boiling point of the organic solvent. In other words, although higher temperature is preferred, the temperature should not exceed 40° C. above the boiling point of the organic solvent.

Operation (e) is an operation of stretching the dried sheet in the transverse direction 4 times or more to mold it into a film, and since the matters for the stretching in the machine direction may be identically applied to the stretch ratio, the stretching manner, and the stretching temperature for the stretching in the transverse direction, specific descriptions thereof will be omitted. In an embodiment, the stretching operation may be performed at 80° C. to 140° C. or 90° C. to 125° C., but is not limited thereto.

Operation (f) is an operation of heat treating the film stretched in the transverse direction, and may be performed by a roll or tenter method. In an embodiment, for example, the operation (f) may be performed at a temperature of 120° C. to 140° C.

In an embodiment, operation (f) may include a heat relaxation process of fixing a longitudinal length of the film stretched in the transverse direction and mitigating (shrinking) a transverse width. Since the heat relaxation process described above is included, a polyolefin microporous membrane having the physical properties to be desired in the present disclosure may be manufactured.

Specifically, the polyethylene microporous membrane, manufactured according to an embodiment including the heat relaxation process described above, has characteristics of larger porosity (or gas permeability) and significantly improved heat resistance, and in particular, a battery to which the microporous membrane described above is applied has low initial resistance and also may achieve excellent thermal safety in a hot-box evaluation.

The heat relaxation process may adjust the transverse width to 80% to 100% of original transverse width.

The heat relaxation process may adjust the transverse width to 80% to 95% or 90% to 95% of original transverse width for more effective implementation of the physical properties to be desired in the present disclosure.

In an embodiment, operation (f) may include a heat stretching process of fixing the longitudinal length and stretching the transverse width of the film stretched in the transverse direction, a heat fixation process of fixing the longitudinal and transverse length/width and applying heat, and the heat relaxation process described above. The heat stretching process may stretch the transverse width to 120% to 160% or 120% to 140% of original transverse width.

A polyethylene microporous membrane having significantly improved heat resistance at a high temperature while having significantly high gas permeability and porosity may be manufactured according to the present invention method which includes heat treating the film under the conditions described above while subjecting the film to stretching in the machine direction, an extraction operation and stretching in the transverse direction. This is contrary to the conventional wisdom. Hence, contrary to the conventional wisdom that when a film which is stretched in the order of the step of stretching in the machine direction, the extraction operation, and the operation of stretching in the transverse direction, is heat treated under the conditions described above, it is difficult to implement both heat resistance and permeability to a specific level or higher by an incompatible relationship between high permeability and heat resistance, a polyethylene microporous membrane having significantly improved heat resistance at a high temperature while having significantly high gas permeability and porosity may be manufactured. A microporous membrane manufactured according to an embodiment of the present disclosure may be suitable for a high output and high capacity battery.

The present disclosure provides a separator including the polyethylene microporous membrane as described above, and the separator may be used in any known energy storage device. For example, the separator may be used in a lithium secondary battery.

Hereinafter, the examples and the experimental examples will be illustrated in detail. However, the examples and the experimental examples described later are only for illustrative purposes, and does not limit the scope of the present disclosure.

[Method of Measuring Physical Properties]

1. Weight Average Molecular Weight (g/mol)

The weight average molecular weight (Mw) was measured using high temperature gel permeation chromatography (GPC) available from Agilent Technologies under model name PL220. PLgel Guard and PLgel Olexis of Agilent Technologies were used as a GPC column, 1,2,4-trichlorobenzene (TCB) was used as a solvent, polystyrene was used as a standard sample, and the analysis was performed at 140° C.

2. Thickness of Microporous Membrane (μm)

The thickness of the microporous membrane was measured using a contact type thickness meter having a measurement precision of 0.1 μm. The measurement was performed at a measurement pressure of 0.63 N using TESA u-Hite Electronic Height Gauge available from TESA.

3. Puncture Strength (N/μm)

The puncture strength was measured by attaching a pin tip having a diameter of 1.0 mm and a radius of curvature of 0.5 mm to Universal Test Machine (UTM) 3345 available from INSTRON and pressing a microporous membrane at a speed of 120 mm/min. At this time, a load (N) when the microporous membrane was broken was divided by a thickness (μm) of the microporous membrane to calculate the puncture strength.

4. Gas Permeability (Darcy)

The gas permeability was measured using a porometer of CFP-1500-AEL available from POROUS MATERIAL INC. (PMI). Generally, the gas permeability is expressed in a Gurley number, but since the Gurley number is not corrected for the effect of the thickness, it is difficult to know relative permeability depending on a pore structure. In order to solve the problem, the gas permeability of the present disclosure was measured using a Darcy permeability coefficient calculated from the following Mathematical Formula 1. Nitrogen was used as gas, and an average value of the Darcy permeability coefficients measured in a range of 100 to 200 psi was calculated. The calculated permeability coefficient C then corresponds to the measured/calculated "permeability value" in "Darcy".

Darcy permeability coefficient (C) = [Mathematical Formula 1]

$$(8F \cdot T \cdot V) / (\pi D^2 (P^2 - 1))$$

F=flow velocity in cc/min
T=sample thickness in mm
V=viscosity of gas (0.185 for $N_2$) in cP
D=diameter of sample in mm
P=pressure in psi 5. Porosity (%)

The porosity of the microporous membrane was calculated by the following Mathematical Formula 2. Specifically, a sample having a width of A cm, a height of B cm, and a thickness of T cm was prepared, its mass was measured, and the porosity was calculated from a ratio between a mass of a resin having the same volume and a mass of a microporous membrane.

Porosity (%) = $100 \times \{1 - M/(A \times B \times T \times \rho)\}$ [Mathematical Formula 2]

wherein M is a mass (g) of a microporous membrane, and ρ is a density (g/cm³) of a polyethylene resin forming a microporous membrane.

6. Shrinkage Rate in the Transverse Direction (%)

A microporous membrane of 15 cm×15 cm in which each of machine and transverse directions was indicated at a length of 10 cm was allowed to stand in an oven (DKN612 available from Yamato) of which the temperature was stabilized to 121° C. for 1 hour, and a change in length was measured to calculate the shrinkage rate in the transverse direction by a method of the following Mathematical Formula 3.

Shrinkage rate (%) in the transverse direction = {(transverse length before heating − transverse length after heating) / transverse length before heating} × 100. [Mathematical Formula 3]

7. Performance & Safety (PS) Index

The PS index of a microporous membrane is an index for evaluating output performance and safety simultaneously, and was calculated by the following Equation 1.

PS index = [Equation 1]

[gas permeability $(\times 10^{-5}$ Darcy$) \times$ porosity (%)] ÷ [shrinkage rate (%) in the transverse direction at 121° C.].

Gas permeability ($\times 10^5$ Darcy) (obtained in section 4. above)

Porosity (%) (obtained in section 5. above)

8. Initial Resistance Test

The initial resistance test was performed using an assembled battery to which a polyethylene microporous membrane was applied as a separator. Specifically, a positive electrode using NCM 622 (Ni:Co:Mn=6:2:2) as an active material and a negative electrode using graphite carbon as an active material were wound with a manufactured microporous membrane and added to an aluminum pouch, an electrolyte solution of 1 M lithium hexafluorophosphate ($LiPF_6$) dissolved in a solution including ethylene carbonate, ethyl methyl carbonate, and diethyl carbonate at a volume ratio of 3:5:2 was injected thereinto, and the pouch was sealed, thereby assembling a battery having a capacity of 2 Ah. The assembled battery was subjected to aging and degassing operations and then fully charged to 4.2 V to measure initial resistance (mΩ).

When the initial resistance was 30 mΩ or less, it was confirmed that a capacity was maintained at 50% or more in a 3C-rate discharge test, and thus, the initial resistance value was an evaluation indicator for output characteristics.

9. Hot-Box Evaluation

The hot-box evaluation was performed using an assembled battery to which a polyethylene microporous membrane was applied as a separator. Specifically, a positive electrode using NCM 622 (Ni:Co:Mn=6:2:2) as an active material and a negative electrode using graphite carbon as an active material were wound with a manufactured microporous membrane and added to an aluminum pouch, an electrolyte solution of 1 M lithium hexafluorophosphate (LiPF$_6$) dissolved in a solution including ethylene carbonate, ethyl methyl carbonate, and diethyl carbonate at a volume ratio of 3:5:2 was injected thereinto, and the pouch was sealed, thereby assembling a battery having a capacity of 2 Ah. The assembled battery was subjected to aging and degassing operations, fully charged to 4.2 V, put into an oven which was heated at a rate of 5° C./min to reach 125° C., and then allowed to stand for 30 minutes, thereby measuring a battery change.

When fuming or ignition occurred in the battery after 30 minutes at 125° C., it was determined as Fail, and when no change in voltage/current of the battery and fuming and ignition did not occur, it was determined as Pass.

EXAMPLE 1

A mixture including a high-density polyethylene resin (0.95 g/cm$^3$) having a weight average molecular weight of 5.0×10$^5$ g/mol and a melting temperature of 135° C. and a paraffin oil having a kinematic viscosity of 80 cst at 40° C. at a weight ratio of 30:70 was melted and kneaded using a twin-screw extruder to prepare a melt. The melting temperature was measured using the differential scanning calorimeter (DSC) Discovery DSC250 available from TA Instruments, and the measurement was performed under the conditions of a sample weight of 5 mg and a scanning speed of 10° C./min.

The melt was continuously extruded through a T-die and a casting roll set to 30° C. was used to manufacture a sheet having a width of 300 mm and an average thickness of 1100 μm.

The sheet was stretched in the machine direction by a roll for 7 times or more at a stretching temperature of 95° C., the paraffin oil was extracted from the sheet stretched in the machine direction at 25° C. using methylene chloride, and the sheet from which the paraffin oil was extracted was dried at 60° C. The dried sheet was stretched in the transverse direction in a tenter method for 8 times or more at a stretching temperature of 122° C. The film stretched in the transverse direction was heat treated in the transverse direction at 130° C. using a tenter method heat fixation device while the longitudinal length was fixed, thereby manufacturing a microporous membrane having a thickness of 11.5 μm. Specifically, the heat treatment in the transverse direction was performed by heat stretching the film in the transverse direction to 135%, then heat fixing for 10 seconds, and heat mitigating (shrinking) to 93% of the width before a heat relaxation process.

The physical properties of the finally manufactured microporous membrane and the performance of a battery to which the microporous membrane was applied are listed in Table 1.

EXAMPLE 2

A polyethylene microporous membrane was manufactured in the same manner as in Example 1, except that the heat treatment was performed while both machine and transverse directions are fixed, and the results are listed in Table 1.

Comparative Example 1

A polyethylene microporous membrane was manufactured in the same manner as in Example 1, except that a high-density polyethylene resin having a weight average molecular weight of 3.0×10$^5$ g/mol was used, the extraction operation was performed after sequentially stretching in the machine direction and the transverse direction to 8 times, respectively, and the heat treatment was performed at 130.5° C., and the results are shown in Table 1. Hence, in example 1 the extraction operation was performed following the stretching in the machine direction and before the stretching in the transverse direction, while in the comparative example 1, the extraction operation was performed after stretching operations in the machine and transverse directions.

COMPARATIVE EXAMPLE 2

A polyethylene microporous membrane was manufactured in the same manner as in Example 1, except that the extraction operation was performed after sequentially stretching in the machine direction and the transverse direction to 8 times, respectively. Hence, in example 1 the extraction operation was performed following the stretching in the machine direction and before the stretching in the transverse direction, while in the comparative example 2, the extraction operation was performed after stretching operations in the machine and transverse directions. The heat treatment was performed at 132° C., the heat stretching was performed in the transverse direction to 155%, heat fixation was performed for 10 seconds, and heat relaxation (shrinkage) was performed to 97% of the width before the heat relaxation, and the results are shown in Table 1.

TABLE 1

| | Unit | Example 1 | Example 2 | Comparative Example 1 | Comparative Example 2 |
|---|---|---|---|---|---|
| Thickness | μm | 11.5 | 10.5 | 7.2 | 9.1 |
| Puncture strength | N/μm | 0.19 | 0.26 | 0.39 | 0.43 |
| Gas permeability | 10$^{-5}$ Darcy | 27.8 | 15.6 | 4.2 | 4.6 |
| Porosity | % | 63.5 | 56.0 | 48.0 | 50.0 |
| Shrinkage rate in the transverse direction at 121° C. | % | 2.1 | 5.0 | 4.3 | 8.3 |
| PS index | — | 841 | 175 | 47 | 28 |
| Initial resistance | mΩ | 27 | 30 | 35 | 34 |
| Hot-box evaluation | — | Pass | Pass | Pass | Fail |

Referring to Table 1, the microporous membranes of Examples 1 and 2 satisfied the shrinkage rate in the transverse direction of 5% or less as measured after being allowed to stand at 121° C. for 1 hour and the PS index of 110 or more, and as a result, the batteries to which the microporous membranes were applied passed the hot-box evaluation while having the initial resistance of 30 mΩ 10 or less. The batteries including the microporous membranes achieved improved output properties and thermal safety.

In particular, since in Example 1, the heat treatment was performed in the transverse direction while the longitudinal length was fixed, Example 1 had the gas permeability, the porosity, and the heat shrinkage rate better than those of Example 2 in which the heat treatment was performed while both the machine and transverse directions were fixed, and thus, had a PS index about 5 times higher than Example 2.

The microporous membrane of Comparative Example 1 was subjected to a diluent extraction operation after the stretching operation in the machine direction and the transverse direction as before, and as a result, had the shrinkage rate in the transverse direction of 5% or less as measured after being allowed to stand at 121° C. for 1 hour but the PS index of less than 110, and thus, the batteries including the microporous membranes had excellent thermal safety, but greatly deteriorated output properties.

The microporous membrane of Comparative Example 2 was subjected to a diluent extraction operation after the stretching operation in the machine direction and the transverse direction as before, and as a result, had the shrinkage rate in the transverse direction of more than 5% as measured after being allowed to stand at 121° C. for 1 hour and the PS index of less than 110, and the batteries including the microporous membranes had both poor thermal safety and output properties.

The polyethylene microporous membrane according to the present disclosure may have high gas permeability and high porosity and also exhibit significantly improved heat resistance at a high temperature.

In addition, the polyethylene microporous membrane according to the present disclosure may have a puncture strength of 0.15 N/μm or more, a shrinkage rate in the transverse direction of 5% or less as measured after being allowed to stand at 121° C. for 1 hour, and significantly high gas permeability and porosity.

Therefore, the present disclosure may provide a battery having improved output properties and thermal safety t a high temperature by including the polyethylene microporous membrane as described above. Hereinabove, although the present disclosure has been described with example various embodiments, the embodiments of the present disclosure are not limited thereto. Embodiments have been provided for illustrative purposes, and should limit the scope of the present disclosure. Example A person having ordinary skill in the art would recognize that various modifications and changes may be made without departing the scope of the present disclosure.

What is claimed is:

1. A polyethylene microporous membrane comprising a thickness of 3 μm to 30 μm, a puncture strength of 0.15 N/μm or more, a shrinkage rate in the transverse direction of 5% or less, and a PS index represented by the following Equation 1 of 110 or more:

$$PS \text{ index} = \text{gas permeability} \ (\times 10^{-5} \text{ Darcy}) \times \text{porosity} \ (\%) \div \text{shrinkage rate (\%) in the transverse direction at } 121° \text{ C.,} \qquad \text{Equation 1}$$

wherein the shrinkage rate is measured after being allowed to stand at 121° C. for 1 hour.

2. The polyethylene microporous membrane of claim 1, wherein the gas permeability is 10.0×10⁻⁵ Darcy or more.

3. The polyethylene microporous membrane of claim 1, wherein the porosity is 55% to 70%.

4. The polyethylene microporous membrane of claim 1, wherein the porosity is 60% to 70%.

5. The polyethylene microporous membrane of claim 1, wherein the PS index is 220 or more.

6. The polyethylene microporous membrane of claim 1, wherein the PS index is 400 or more.

7. The polyethylene microporous membrane of claim 1, including a polyethylene having a weight average molecular weight of 1×10⁵ g/mol to 10×10⁵ g/mol.

8. The polyethylene microporous membrane of claim 1, wherein the microporous membrane is manufactured by a polyethylene film.

9. A separator comprising the polyethylene microporous membrane of claim 1.

10. A microporous membrane comprising:
a thin film of a thickness of 3 μm to 30 μm made of polyethylene having a weight average molecular weight of 1×10⁵ g/mol to 10×10⁵ g/mol, and a PS index represented by the following of 110 or more:

$$PS \text{ index} = \text{gas permeability} \ (\times 10^{-5} \text{ Darcy}) \times \text{porosity (\%)} \div \text{shrinkage rate (\%) in the transverse direction at } 121° \text{ C.,}$$

wherein the shrinkage rate is measured after being allowed to stand at 121° C. for 1 hour,
wherein the gas permeability is 10.0×10⁻⁵ Darcy or more, and
wherein the porosity is 55% to 70%.

11. An electrochemical device comprising the separator of claim 9.

12. The electrochemical device of claim 11, which is a secondary battery comprising said separator between a positive electrode and a negative electrode.

* * * * *